(12) United States Patent
Lee

(10) Patent No.: US 11,102,999 B2
(45) Date of Patent: Aug. 31, 2021

(54) METHOD OF PREPARING SEASONED RAW POLLOCK AND SEASONED RAW POLLOCK PREPARED BY USING THE SAME

(71) Applicant: Ji Yeon Lee, Gangwon-do (KR)

(72) Inventor: Ji Yeon Lee, Gangwon-do (KR)

( * ) Notice: Subject to any disclaimer, the term of this patent is extended or adjusted under 35 U.S.C. 154(b) by 701 days.

(21) Appl. No.: 15/758,983

(22) PCT Filed: Apr. 6, 2017

(86) PCT No.: PCT/KR2017/003755
§ 371 (c)(1),
(2) Date: Mar. 9, 2018

(87) PCT Pub. No.: WO2017/176057
PCT Pub. Date: Oct. 12, 2017

(65) Prior Publication Data
US 2020/0297012 A1    Sep. 24, 2020

(30) Foreign Application Priority Data

Apr. 6, 2016   (KR) .................. 10-2016-0042176
Dec. 16, 2016  (KR) .................. 10-2016-0172215

(51) Int. Cl.
| | |
|---|---|
| *A23L 17/00* | (2016.01) |
| *A23L 27/40* | (2016.01) |
| *A23L 27/10* | (2016.01) |
| *A23L 29/30* | (2016.01) |
| *A23L 27/12* | (2016.01) |
| *A23B 4/023* | (2006.01) |
| *A23B 4/12* | (2006.01) |

(52) U.S. Cl.
CPC ............ *A23L 17/00* (2016.08); *A23B 4/0235* (2013.01); *A23B 4/12* (2013.01); *A23L 27/105* (2016.08); *A23L 27/12* (2016.08); *A23L 27/40* (2016.08); *A23L 29/30* (2016.08); *A23V 2002/00* (2013.01)

(58) Field of Classification Search
CPC ........ A23L 17/00; A23L 27/40; A23L 27/105; A23L 29/30; A23L 27/12; A23B 4/0235; A23B 4/12; A23V 2002/00
USPC .............................................. 426/7, 643, 61
See application file for complete search history.

(56) References Cited

FOREIGN PATENT DOCUMENTS

| | | | |
|---|---|---|---|
| KR | 10-2001-0028217 A | 4/2001 | |
| KR | 973678 B1 * | 8/2003 | ............ A23B 4/023 |
| KR | 10-2006-0084413 A | 7/2006 | |
| KR | 10-0900350 B1 | 6/2009 | |
| KR | 10-0973678 B1 | 8/2010 | |
| KR | 10-2011-0093247 A | 8/2011 | |
| KR | 10-2012-0134811 A | 12/2012 | |
| KR | 20120134811 A * | 12/2012 | |
| KR | 10-1710342 B1 | 2/2017 | |

OTHER PUBLICATIONS

International Search Report for PCT/KR2017/003755.

* cited by examiner

*Primary Examiner* — Brent T O'Hern
(74) *Attorney, Agent, or Firm* — The PL Law Group, PLLC

(57) ABSTRACT

A method of preparing seasoned raw pollock includes cutting pollock flesh from pollock of which skin has been removed, preparing a salt mixture by adding *Euphorbia humifusa* powder and *Dryopteris crassirhizoma* powder to deep sea water brine, salting the pollock flesh in the salt mixture; preparing a vinegar mixture by adding *Ixeris dentata* powder and *Androsace umbellata* powder to vinegar water, performing fermentation by immersing the salted pollock flesh in the vinegar mixture, and mixing the fermented pollock flesh with salt, red pepper powder, garlic, ginger, sugar, syrup, vinegar, and sesame. Seasoned raw pollock is prepared by using the method, and a processed food is produced by using the seasoned raw pollock.

6 Claims, No Drawings

METHOD OF PREPARING SEASONED RAW POLLOCK AND SEASONED RAW POLLOCK PREPARED BY USING THE SAME

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2017/003755, filed Apr. 6, 2017, which claims priority to the benefit of Korean Patent Application Nos. 10-2016-0042176 filed on Apr. 6, 2016 and 10-2016-0172215 filed on Dec. 16, 2016, now Korean Patent No. 10-1710342 issued on Feb. 21, 2017 in the Korean Intellectual Property Office, the entire contents of which are incorporated herein by reference.

TECHNICAL FIELD

The present disclosure relates to a method of preparing seasoned raw pollock, the method including (a) cutting pollock flesh from pollock of which skin has been removed; (b) preparing a salt mixture by adding *Euphorbia humifusa* powder and *Dryopteris crassirhizoma* powder to deep sea water brine; (c) salting the pollock flesh cut in process (a) in the salt mixture obtained in process (b); (d) preparing a vinegar mixture by adding *Ixeris dentata* powder and *Androsace umbellate* powder to vinegar water; (e) performing fermentation by immersing the pollock flesh, which has been salted in process (c), in the vinegar mixture prepared in process (d); and (f) mixing the pollock flesh fermented in process (e) with salt, red pepper powder, garlic, ginger, sugar, syrup, vinegar, and sesame, seasoned raw pollock prepared by using the method, and a processed food produced by using the seasoned raw pollock.

BACKGROUND ART

Pollock is a fish that is classified as *Gadus macrocephalus*, which is called as Dae-gu (meaning a big mouth) due to its big head and mouth, and that is cold-current fish. Pollock is a major aquatic product of Korea, Russia, and Japan. Pollock is caught by using Junnak or nets during most of the year. From ancient times, pollock has been regarded as a precious fish that is indispensable to ceremonial occasions such as ancestral memorial rites and sacrificial rites, and traditional marriage ceremonies. Pollock is called as various names determined according to the state, the time and place when and where pollock is caught, habitat, and the like.

For example, pollock, according to its state, is called as Saeng-tae, Dong-tae, Bug-eo (Geon-tae), Hwang-tae, Kodali, Baegtae, Heugtae, Kkangtae, or the like. Saeng-tae refers to fresh pollock, Dong-tae refers to frozen pollock, and Bug-eo (Geon-tae) refers to dried pollock. Hwang-tae refers to yellow Bug-eo that is obtained by repeating twenty or more times the cycle of freezing and thawing pollock exposed to cold winder while hung on the field where the change in temperature between day and night is substantial during winter. Hwang-tae is also called as Deodeog Bug-eo due to its dry-frozen state like Deodeog. Kodali refers to pollock that is dried to be stiff while being speared by a single stick together with three or four pollock at the same time after guts and gills thereof are removed therefrom. Baeg-tae refers to dried white pollock, Heug-tae refers to dried black pollock, and Kkang-tae refers to dried stiff pollock. According to the growth state, young pollock is called as Aegi-tae, Ae-tae, and Nogali.

These pollocks are cooked in various forms, and the best season for catching and cooking pollock is from January to February in winter, and heads, tails, flesh, and guts of pollock are all used as food ingredients. Flesh and Gonyi, the ovarian membrane filled with eggs, are used for soups and stew, and eggs and bowels are used for the salted-fermented pollock roe and the salted-fermented pollock bowel, respectively. Pollock is rich in proteins, and contains a variety of essential amino acids such as leucine and lysine. Among the representative foods using pollock, there are flesh pollock stew, flesh pollock hot soup, roasted Hwang-tae, steamed Hwang-tae, Bug-eo soup, seasoned Bug-eo, and the like. However, there are few processed foods that allow pollock to be eaten in a raw state.

Korean Patent Laid-Open Publication No. 2011-0093247 discloses a method of processing raw seasoned fish, and Korean Patent Laid-Open Publication No. 2001-0028217 discloses a method of producing raw fish for cold noodles. However, these disclosures are distinguished from the method of preparing seasoned raw pollock (seasoned pollock sashimi) according to the present disclosure.

SUMMARY

Provided is a method of preparing seasoned raw pollock having excellent texture and improved flavor, the method obtained, to prepare seasoned raw pollock by using Pollock, by optimizing preparation conditions including the cutting and pre-treatment of pollock, selecting of ingredients, and mixed ratios. In particular, it is confirmed that the texture of raw pollock is improved when the cut pollock flesh is salted in the salt mixture and then immersed in the vinegar mixture, compared to when the salting with the salt mixture and immersing with the vinegar mixture are performed at the same time.

According to aspects of embodiments, a method of preparing seasoned raw pollock includes (a) cutting pollock flesh from pollock of which skin has been removed; (b) preparing a salt mixture by adding *Euphorbia humifusa* powder and *Dryopteris crassirhizoma* powder to deep sea water brine; (c) salting the pollock flesh cut in process (a) in the salt mixture obtained in process (b); (d) preparing a vinegar mixture by adding *Ixeris dentata* powder and *Androsace umbellate* powder to vinegar water; (e) performing fermentation by immersing the pollock flesh, which has been salted in process (c), in the vinegar mixture prepared in process (d); and (f) mixing the pollock flesh fermented in process (e) with salt, red pepper powder, garlic, ginger, sugar, syrup, vinegar, and sesame, seasoned raw pollock prepared by using the method.

According to one or more embodiments of the present disclosure, provided is seasoned raw pollock prepared by using the method.

According to one or more embodiments of the present disclosure, provided is a processed food obtained by using the seasoned raw pollock.

Seasoned raw pollock according to the present disclosure loses its fishy smell due to a pre-treatment while retaining pollock's original taste and flavor and improving texture and taste. Also, in the case of the seasoned raw pollock in which side ingredients are appropriately mixed, pre-treated pollock are well mixed with the flavor of the side ingredients to improve the acceptability. Accordingly, the seasoned raw pollock according to the present disclosure can be used for various processed foods including cold noodles or Sushi.

DETAILED DESCRIPTION

The present disclosure provides a method of preparing seasoned raw pollock, wherein the method includes (a) cutting pollock flesh from pollock of which skin has been removed;

(b) preparing a salt mixture by adding *Euphorbia humifusa* powder and *Dryopteris crassirhizoma* powder to deep sea water brine;

(c) salting the pollock flesh cut in process (a) in the salt mixture obtained in process (b);

(d) preparing a vinegar mixture by adding *Ixeris dentata* powder and *Androsace umbellate* powder to vinegar water;

(e) performing fermentation by immersing the pollock flesh, which has been salted in process (c), in the vinegar mixture prepared in process (d); and (f) mixing the pollock flesh fermented in process (e) with salt, red pepper powder, garlic, ginger, sugar, syrup, vinegar, and sesame.

In the method of preparing the seasoned raw pollock, in the cutting of process (a), pollock flesh may be cut in a length of about 6 cm to about 8 cm, a height of about 0.4 cm to about 0.6 cm, and a thickness of about 0.4 cm to about 0.6 cm. In one or more embodiments, pollock flesh may be cut in a length of about 7 cm, a height of about 0.5 cm, and a thickness of about 0.5 cm. The pollock flesh cut in such ranges of length, height, and thickness are suitable for one-bite size eating, providing pollock flesh appropriate for the preparation of seasoned raw pollock that is harmonized with seasonings and has excellent texture.

In the method of preparing the seasoned raw pollock, the salt mixture in process (b) may be prepared by adding of *Euphorbia humifusa* powder and *Dryopteris crassirhizoma* powder to about 2.5 to about 4.5% (w/v) of deep sea water brine, wherein the amount of each of *Euphorbia humifusa* powder and *Dryopteris crassirhizoma* is in the range of about 0.8% to about 1.2% based on the weight of deep sea water brine. In one or more embodiments, the salt mixture may be prepared by adding *Euphorbia humifusa* powder and *Dryopteris crassirhizoma* powder to about 2.5 to about 4.5% (w/v) deep sea water brine, wherein the amount of each of *Euphorbia humifusa* powder and *Dryopteris crassirhizoma* powder was 1% based on the weight of deep sea water brine. The deep sea water brine is prepared by mixing deep sea water salt and water. Deep sea water salt is a salt that is processed by removing water from deep sea water. The deep sea water salt is less salty and richer in mineral content than general salt. Accordingly, pollock processed with deep sea water salt provides a lot of minerals and flesh with improved texture and flavor. Also, by immersing pollock flesh with the salt mixture prepared in the above-described conditions, pollock flesh is appropriately salted, loses its unique fishy smell, and has improved texture.

In the method of preparing the seasoned raw pollock, in the process (c), the cut pollock flesh is salted in the salt mixture at a temperature of about 15 to about 20° C. for about 10 hours to about 14 hours. In one or more embodiments, the cut pollock flesh may be salted in the salt mixture at a temperature of about 18° C. for about 12 hours. Due to the salting of pollock flesh in the salt mixture in the above-described conditions, the salt level is adjusted to be suitable for the taste of consumers, and the texture is improved. However, when the salting conditions are outside these ranges, the salt level of pollock flesh is inappropriate or the texture thereof is degraded.

In the method of preparing the seasoned raw pollock, the vinegar mixture in process (d) may be prepared by adding *Ixeris dentata* powder and *Androsace umbellate* powder to about 8 to about 12% (v/v) vinegar water, wherein each of *Ixeris dentata* powder and *Androsace umbellate* powder is in a range of about 0.8% to about 1.2% based on the weight of the vinegar water. In one or more embodiments, *Ixeris dentata* powder and *Androsace umbellate* powder may be added to about 10% (v/v) vinegar water, wherein each of *Ixeris dentata* powder and *Androsace umbellate* powder is about 1% based on the weight of the vinegar water. The vinegar mixture prepared in the above-described conditions may provide pollock flesh with appropriate level of sourness and thus further-improved texture.

In the method of preparing the seasoned raw pollock, in the process (e), the pollock flesh salted in the salt mixture may be fermented by being immersed in the vinegar mixture at a temperature of about 15° C. to about 20° C. for 10 hours to 14 hours. In one or more embodiments, the pollock flesh salted in the salt mixture may be fermented by being immersed in the vinegar mixture at a temperature of about 18° C. for 12 hours. Due to the fermentation of the pollock flesh in the vinegar mixture in the above-described conditions, the pollock flesh may have a sour taste and improved elastic properties, leading to better chewing texture.

In the method of preparing the seasoned raw pollock, in process (f), based on 100 parts by weight of the seasoned raw pollock, about 45 parts by weight to about 55 parts by weight of the fermented pollock flesh may be mixed with about 6 parts by weight to about 8 parts by weight of salt, about 12 parts by weight to about 18 parts by weight of red pepper powder, about 3 parts by weight to about 4 parts by weight of garlic, about 1.2 parts by weight to about 1.8 parts by weight of ginger, about 2 parts by weight to about 4 parts by weight of sugar, about 12 parts by weight to about 18 parts by weight of syrup, 2 parts by weight to about 4 parts by weight of vinegar, and about 1 part by weight to about 3 parts by weight of sesame. In one or more embodiments, based on 100 parts by weight of the seasoned raw pollock, 50 parts by weight of the fermented pollock flesh may be mixed with about 7 parts by weight of salt, about 15 parts by weight of red pepper powder, about 3.5 parts by weight of garlic, about 1.5 parts by weight of ginger, about 3 parts by weight of sugar, about 15 parts by weight of syrup, about 3 parts by weight of vinegar, and about 2 parts by weight of sesame. In the case of the seasoned raw pollock prepared by using the above-described ingredients and mixed ratios, the fermented pollock flesh may be harmonized with side ingredient seasonings and thus the prepared seasoned raw pollock has better flavor and savory.

The method of preparing seasoned raw pollock according to the present disclosure will be described in detail. The method includes:

(a) cutting pollock flesh of pollock of which skin has been removed in a length of about 6 cm to about 8 cm, a height of about 0.4 cm to about 0.6 cm, and a thickness of about 0.4 cm to about 0.6 cm;

(b) preparing a salt mixture by adding of *Euphorbia humifusa* powder and *Dryopteris crassirhizoma* powder to about 2.5 to about 4.5% (w/v) of deep sea water brine, wherein the amount of each of *Euphorbia humifusa* powder and *Dryopteris crassirhizoma* is in the range of about 0.8% to about 1.2% based on the weight of deep sea water brine;

(c) salting the pollock flesh cut in process (a) in the salt mixture prepared in process (b) at a temperature of about 15° C. to about 20° C. for 10 hours to 14 hours;

(d) preparing a vinegar mixture by adding *Ixeris dentata* powder and *Androsace umbellate* powder to about 8 to about 12% (v/v) vinegar water, wherein each of *Ixeris dentata* powder and *Androsace umbellate* powder is in a range of about 0.8% to about 1.2% based on the weight of the vinegar water;

(e) performing fermentation by immersing the pollock flesh, which has been salted in the salt mixture in process (c), in the vinegar mixture prepared in process (d) at a temperature of about 15° C. to about 20° C. for 10 hours to 14 hours; and (f) based on 100 parts by weight of the seasoned raw pollock, mixing about 45 parts by weight to about 55 parts by weight of the pollock flesh fermented in process (e) with about 6 parts by weight to about 8 parts by weight of salt, about 12 parts by weight to about 18 parts by weight of red pepper powder, about 3 parts by weight to about 4 parts by weight of garlic, about 1.2 parts by weight to about 1.8 parts by weight of ginger, about 2 parts by weight to about 4 parts by weight of sugar, about 12 parts by weight to about 18 parts by weight of syrup, 2 parts by weight to about 4 parts by weight of vinegar, and about 1 part by weight to about 3 parts by weight of sesame.

In one or more embodiments, the method may include:

(a) cutting pollock flesh of pollock of which skin has been removed in a length of about 7 cm, a height of about 0.5 cm, and a thickness of about 0.5 cm;

(b) preparing a salt mixture by adding of *Euphorbia humifusa* powder and *Dryopteris crassirhizoma* powder to about 2.5 to about 4.5% (w/v) of deep sea water brine, wherein the amount of each of *Euphorbia humifusa* powder and *Dryopteris crassirhizoma* is about 1% based on the weight of deep sea water brine;

(c) salting the pollock flesh cut in process (a) in the salt mixture prepared in process (b) at a temperature of about 18° C. for 12 hours;

(d) preparing a vinegar mixture by adding *Ixeris dentata* powder and *Androsace umbellate* powder to about 10% (v/v) vinegar water, wherein each of *Ixeris dentata* powder and *Androsace umbellate* powder is 1% based on the weight of the vinegar water;

(e) performing fermentation by immersing the pollock flesh, which has been salted in the salt mixture in process (c), in the vinegar mixture prepared in process (d) at a temperature of about 18° C. for 12 hours; and (f) based on 100 parts by weight of the seasoned raw pollock, mixing 50 parts by weight of the pollock flesh fermented in process (e) with about 7 parts by weight of salt, about 15 parts by weight of red pepper powder, about 3.5 parts by weight of garlic, about 1.5 parts by weight of ginger, about 3 parts by weight of sugar, about 15 parts by weight of syrup, about 3 parts by weight of vinegar, and about 2 parts by weight of sesame.

The present disclosure also provides seasoned raw pollock prepared by using the method.

The present disclosure also provides a processed food by using the seasoned raw pollock. There is no particular limitation on the type of the processed food. Examples of the food to which the seasoned raw pollock is added are a cold noodle with raw fish, a noodle soup with raw fish, a soup with raw fish, and Sushi with raw fish.

Hereinafter, Preparation Examples and Examples of the present disclosure will be described in detail. However, the following Preparation Examples and Examples are presented herein for illustrative purpose only, and the content of the present disclosure is not limited to the following Preparation Examples and Examples.

Preparation Example 1: Preparation of Seasoned Raw Pollock (a) Frozen pollock was thawed, and then, pollock flesh obtained after removing pollock skin from the frozen pollock was cut to a length of 7 cm, a height of 0.5 cm, and a thickness of 0.5 cm.

(b) *Euphorbia humifusa* (part: leaf), *Dryopteris crassirhizoma* (part: leaf), *Ixeris dentata*(*Ixeris dentata* (part: leaf and root), and *Androsace umbellate* (part: young sprout) were separately dried at a temperature of 40° C. to 50° C. for 6 hours, and then, milled to obtain *Euphorbia humifusa* powder, *Dryopteris crassirhizoma* powder, *Ixeris dentata* powder, and *Androsace umbellate* powder.

(c) *Euphorbia humifusa* powder and *Dryopteris crassirhizoma* powder were each added in an amount of 1% based on the weight of the deep sea water brine to 2.5 to 4.5% (w/v) of deep sea water brine.

(d) The pollock flesh cut in process (a) was salted in the salt mixture prepared in process (c) at a temperature of 18° C. for 12 hours.

(e) *Ixeris dentata* powder and *Androsace umbellate* powder prepared in process (b) were added in an amount of 1% based on the weight of the vinegar water to 10% (v/v) vinegar water (prepared by diluting a vinegar stock solution with water at a concentration ratio of 1:10).

(f) The pollock flesh, which has been salted in the salt mixture in process (d), was immersed in the vinegar mixture prepared in process (e) at a temperature of 18° C. for 12 hours to perform fermentation.

(g) 50 parts by weight of the pollock flesh fermented in process (f) was smoothly mixed with 7 parts by weight of table salt, 15 parts by weight of red pepper powder, 3.5 parts by weight of chopped garlic, 1.5 parts by weight of chopped ginger, 3 parts by weight of sugar, 15 parts by weight of syrup, 3 parts by weight of vinegar, and 2 parts by weight of sesame, based on 100 parts by weight of the seasoned raw pollock.

Comparative Example 1: Preparation of Seasoned Raw Pollock (a) Thawed pollock was sliced to a size of 7 cm and then, 10 kg of pollock flesh having a thickness of 1 cm was mixed with 3 kg of sugar, 1.3 kg of salt, and 300 ml of edible acetic acid, and then, the mixture was fermented at a temperature of 10° C. to 15° C. for 36 hours.

(b) The result obtained by the fermentation in process (a) was dehydrated, and then, mixed with 600 g of red pepper powder, 1 kg of sugar, 35 g of L-sodium glutamate, 20 g of black sesame, 300 g of ginger, 280 g of garlic, 50 ml of vinegar, 100 ml of sesame oil, and 3 kg of syrup.

Comparative Example 2: Preparation of Seasoned Raw Pollock (a) Frozen pollock was thawed, and then, pollock flesh obtained after removing pollock skin from the frozen pollock was cut to a length of about 7 cm, a height of about 0.5 cm, and a thickness of about 0.5 cm.

(b) The pollock flesh cut in process (a) was salted in 2.5 to 4.5% (w/v) deep sea water brine at a temperature of 18° C. for 12 hours.

(c) The pollock flesh salted in the deep sea water brine in process (b) was immersed in 10% (v/v) vinegar water (prepared by diluting a vinegar stock solution with water at a concentration ratio of 1:10) at a temperature of 18° C. for 12 hours to perform fermentation.

(d) 50 parts by weight of the pollock flesh fermented in process (c) was smoothly mixed with 7 parts by weight of table salt, 15 parts by weight of red pepper powder, 3.5 parts by weight of chopped garlic, 1.5 parts by weight of chopped ginger, 3 parts by weight of sugar, 15 parts by weight of syrup, 3 parts by weight of vinegar, and 2 parts by weight of sesame, based on 100 parts by weight of the seasoned raw pollock.

Comparative Example 3: Preparation of Seasoned Raw Pollock

Seasoned raw pollock was prepared in the same manner as in Preparation Example 1, except that pollock flesh was pre-treated with a salt mixture in which *Euphorbia humifusa* powder was not added to deep sea water brine in process (c).

Comparative Example 4: Preparation of Seasoned Raw Pollock

Seasoned raw pollock was prepared in the same manner as in Preparation Example 1, except that pollock flesh was pre-treated with a vinegar mixture in which *Androsace umbellate* powder was not added to the vinegar mixture in process (e).

Comparative Example 5: Preparation of Seasoned Raw Pollock

Seasoned raw pollock was prepared in the same manner as in Preparation Example 1, except that, without the separate performing of the salting with the salt mixture in process (d) and the immersing with the vinegar mixture in process (f), pollock flesh was immersed in a mixture including the salt mixture and the vinegar mixture at a volumetric ratio of 1:1 at a temperature of 18° C. for 12 hours.

Experimental Methods (1) Texture

A sample was evaluated by using a rheometer (CR-100 Sun Scientific Co Ltd, Tokyo, Japan) with conditions including a load cell of 10 kg, a table speed of 80 mm/min, a set value of 2.0 mm, and an adaptor of No 20 (Ø 20 mm) as follows: the center of the sample was consecutively pressed twice and the hardness, elasticity, and cohesiveness thereof were measured three times and an average of measurements for each property was obtained.

(2) Sensory Evaluation

The sensory evaluation was conducted with 20 sensory test participants. The sensory evaluation proceeded on the degree of fishy smell, color, flavor, taste, texture, and overall acceptability. The 5-point scale method was used in which the point of 5 is the greatest value. The participants recorded scores according to the following evaluation standard, and then, the scores were averaged and the obtained averages were recorded. In the case of color, flavor, taste, texture, and overall acceptability, when the acceptability is high, the participants were guided to mark high points, and in the case of the fishy smell, stronger fishy smell had higher scores.

Example 1: Texture of Seasoned Raw Pollock According to Pollock Pretreatment Conditions Measurements of the hardness, elasticity, and cohesiveness of the seasoned raw pollock of Preparation Example 1 and Comparative Examples are shown in Table 1. As a result, it can be seen that the seasoned raw pollock of Preparation Example 1 had a higher level of hardness than that of Comparative Examples. That is, the seasoned raw pollock of Preparation Example 1 had more stiff flesh quality than that of Comparative Examples. Regarding elasticity and cohesiveness, the seasoned raw pollock of Preparation Example 1 showed higher values than that of Comparative Examples. Accordingly, it was confirmed that due to the use of *Euphorbia humifusa* and *Dryopteris crassirhizoma* powder in the salt mixture and of *Ixeris dentata* and *Androsace umbellate* powder in the vinegar mixture in the seasoned raw pollock of Preparation Example 1, the elasticity and cohesiveness of pollock flesh were improved and thus the texture of the raw pollock was improved.

The seasoned raw pollock prepared by using the method according to Comparative Example 1 showed the lowest levels of hardness, elasticity, and cohesiveness among the seasoned raw pollocks of Comparative Examples. Like in Comparative Example 5, even when the seasoned raw pollock is prepared by immersing pollock flesh in a mixture including the salt mixture and the vinegar mixture, the hardness, elasticity, and cohesiveness showed lower levels than those obtained according to Preparation Example 1, and Comparative Examples 3 and 4. This result shows that when the salt mixture and the vinegar mixture are separately used for the immersion process, the texture of pollock is improved.

TABLE 1

Example 1: Texture of seasoned raw pollock according to pollock pretreatment conditions

| Examples | Hardness (g/cm$^2$) | Elasticity | Cohesiveness |
|---|---|---|---|
| Preparation Example 1 | 2,668 ± 45.2 | 80.2 ± 2.0 | 28.5 ± 1.2 |
| Comparative Example 1 | 954 ± 20.5 | 20.1 ± 1.5 | 8.6 ± 0.6 |
| Comparative Example 2 | 2,245 ± 51.4 | 65.8 ± 2.4 | 20.5 ± 1.0 |
| Comparative Example 3 | 2,489 ± 38.1 | 74.2 ± 1.7 | 25.6 ± 0.9 |
| Comparative Example 4 | 2,421 ± 55.0 | 72.4 ± 2.9 | 25.8 ± 2.7 |
| Comparative Example 5 | 2,378 ± 35.1 | 69.7 ± 2.1 | 22.8 ± 1.7 |

Example 2: Sensory Evaluation of Seasoned Raw Pollock According to Preparation Conditions Sensory evaluation was performed on the seasoned raw pollock of Preparation Example 1 and Comparative Examples (Table 2). As a result, the seasoned raw pollock of Preparation Example 1 scored the point of 0.4 in the fishy degree, and it was confirmed that the pre-treatment conditions of Preparation Example 1 were effective for removing the fishy smell of raw pollock, and the seasoned raw pollock of Comparative Example 1 scored the highest point in the fishy degree. Even regarding taste, texture, and overall acceptability, Preparation Example 1 scored the point of 4.5 or more, whereas the seasoned raw pollock of Comparative Examples scored lower points than Preparation Example 1. Accordingly, it was confirmed that when the seasoned raw pollock was prepared using the pre-treatment conditions according to Preparation Example 1, better flavor and improved texture were obtained.

TABLE 2

Sensory evaluation of seasoned raw pollock according to preparation conditions

| Examples | Level of fishy smell | Taste | Texture | Overall acceptability |
|---|---|---|---|---|
| Preparation Example 1 | 0.40 | 4.57 | 4.62 | 4.60 |
| Comparative Example 1 | 4.20 | 3.45 | 3.25 | 3.32 |
| Comparative Example 2 | 1.20 | 4.28 | 4.32 | 4.30 |
| Comparative Example 3 | 0.68 | 4.44 | 4.40 | 4.40 |

TABLE 2-continued

Sensory evaluation of seasoned raw pollock according to preparation conditions

| Examples | Level of fishy smell | Taste | Texture | Overall acceptability |
|---|---|---|---|---|
| Comparative Example 4 | 0.54 | 4.40 | 4.46 | 4.42 |
| Comparative Example 5 | 1.00 | 4.30 | 4.32 | 4.32 |

Example 3: Sensory Evaluation of Seasoned Raw Pollock According to Ingredients and Mixed Ratios The sensory evaluation was conducted with 20 trained participants by using the seasoned raw pollock prepared according to Preparation Example 1 and the seasoned raw pollock prepared in the same manner as in Preparation Example 1 except for mixed ratios of ingredients (Comparative Examples 6 and 7).

TABLE 3

Mixed ratios of ingredients of seasoned raw pollock (% by weight)

| Ingredients | Preparation Example 1 | Comparative Example 6 | Comparative Example 7 |
|---|---|---|---|
| Fermented pollock flesh | 50 | 57 | 40 |
| Table salt | 7 | 3 | 11 |
| Red pepper powder | 15 | 20 | 10 |
| Chopped garlic | 3.5 | 1 | 5 |
| Chopped ginger | 1.5 | 3 | 0.5 |
| Sugar | 3 | 1 | 5 |
| Syrup | 15 | 10 | 22 |
| Vinegar | 3 | 1 | 6 |
| Sesame | 2 | 4 | 0.5 |
| Total | 100 | 100 | 100 |

Sensory evaluation results show, as in Table 4, that the seasoned raw pollock of Preparation Example 1 scored higher points than the seasoned raw pollock prepared by using different ratios of ingredients (Comparative Examples 6 and 7) in terms of color, flavor, taste, and overall acceptability. Therefore, it was confirmed that when the mixed ratios according to Preparation Example 1 are used to prepare the seasoned raw pollock, the color and flavor are improved, and thus, the acceptability is improved.

TABLE 4

Sensory evaluation of seasoned raw pollock according to mixed ratios of ingredients

| Examples | Color | Flavor | Taste | Overall acceptability |
|---|---|---|---|---|
| Preparation Example 1 | 4.46 | 4.66 | 4.57 | 4.60 |
| Comparative Example 6 | 4.06 | 4.14 | 4.22 | 4.12 |
| Comparative Example 7 | 4.18 | 4.20 | 4.26 | 4.16 |

What is claimed is:

1. A method of preparing seasoned raw pollock, the method comprising:
   (a) cutting pollock flesh of raw pollock of which skin has been removed;
   (b) preparing a salt mixture by adding of *Euphorbia humifusa* powder and *Dryopteris crassirhizoma* powder to 2.5 to 4.5% (w/v) of deep sea water brine, wherein the amount of each of *Euphorbia humifusa* powder and *Dryopteris crassirhizoma* is in the range of 0.8% to 1.2% based on the weight of deep sea water brine;
   (c) salting the pollock flesh cut in process (a) in the salt mixture prepared in process (b) for 10 hours to 14 hours;
   (d) preparing a vinegar mixture by adding *Ixeris dentata* powder and *Androsace umbellata* powder to 8 to 12% (v/v) vinegar water, wherein each of *Ixeris dentata* powder and *Androsace umbellata* powder is in a range of 0.8% to 1.2% based on the weight of the vinegar water;
   (e) performing fermentation by immersing the pollock flesh, which has been salted in the salt mixture in process (c), in the vinegar mixture prepared in process (d) for 10 hours to 14 hours; and
   (f) based on 100 parts by weight of the seasoned raw pollock, mixing 45 parts by weight to 55 parts by weight of the pollock flesh fermented in process (e) with 6 parts by weight to 8 parts by weight of salt, 12 parts by weight to 18 parts by weight of red pepper powder, 3 parts by weight to 4 parts by weight of garlic, 1.2 parts by weight to 1.8 parts by weight of ginger, 2 parts by weight to 4 parts by weight of sugar, 12 parts by weight to 18 parts by weight of syrup, 2 parts by weight to 4 parts by weight of vinegar, and 1 part by weight to 3 parts by weight of sesame.

2. A method of preparing seasoned raw pollock, the method comprising:
   (a) cutting pollock flesh of pollock of which skin has been removed in a length of 6 cm to 8 cm, a height of 0.4 cm to 0.6 cm, and a thickness of 0.4 cm to 0.6 cm;
   (b) preparing a salt mixture by adding *Euphorbia humifusa* powder and *Dryopteris crassirhizoma* powder to 2.5 to 4.5% (w/v) of deep sea water brine, wherein the amount of each of *Euphorbia humifusa* powder and *Dryopteris crassirhizoma* is in the range of 0.8% to 1.2% based on the weight of the deep sea water brine;
   (c) salting the pollock flesh cut in process (a) in the salt mixture prepared in process (b) at a temperature of 15° C. to 20° C. for 10 hours to 14 hours;
   (d) preparing a vinegar mixture by adding *Ixeris dentata* powder and *Androsace umbellata* powder to 8 to 12% (v/v) vinegar water, wherein each of *Ixeris dentata* powder and *Androsace umbellata* powder is in a range of 0.8% to 1.2% based on the weight of the vinegar water;
   (e) performing fermentation by immersing the pollock flesh, which has been salted in the salt mixture in process (c), in the vinegar mixture prepared in process (d) at a temperature of 15° C. to 20° C. for 10 hours to 14 hours; and
   (f) based on 100 parts by weight of the seasoned raw Pollock, mixing 45 parts by weight to 55 parts by weight of the pollock flesh fermented in process (e) with 6 parts by weight to 8 parts by weight of salt, 12 parts by weight to 18 parts by weight of red pepper powder, 3 parts by weight to 4 parts by weight of garlic, 1.2 parts by weight to 1.8 parts by weight of ginger, 2 parts by weight to 4 parts by weight of table sugar, 12 parts by weight to 18 parts by weight of syrup, 2 parts by weight to 4 parts by weight of white vinegar, and 1 part by weight to 3 parts by weight of sesame.

3. A seasoned raw pollock prepared by using the method according to claim 1.

4. A processed food using the seasoned raw pollock of claim 3.

5. A seasoned raw pollock prepared by using the method according to claim 2.

6. A processed food using the seasoned raw pollock of claim 5.

* * * * *